United States Patent
Cheng et al.

(10) Patent No.: US 9,780,901 B2
(45) Date of Patent: Oct. 3, 2017

(54) METHOD AND APPARATUS FOR REFERENCE SIGNALING ALLOCATION AND CHANNEL ESTIMATION IN DISTRIBUTED ANTENNA SYSTEMS

(75) Inventors: Shan Cheng, Suwon-si (KR); Youn Sun Kim, Seongnam-si (KR); Ju Ho Lee, Suwon-si (KR); Jin Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 213 days.

(21) Appl. No.: 13/311,175

(22) Filed: Dec. 5, 2011

(65) Prior Publication Data

US 2013/0163499 A1    Jun. 27, 2013

Related U.S. Application Data

(60) Provisional application No. 61/419,557, filed on Dec. 3, 2010.

(51) Int. Cl.
*H04H 20/71* (2008.01)
*H04W 4/00* (2009.01)
(Continued)

(52) U.S. Cl.
CPC ........ *H04J 11/0079* (2013.01); *H04L 5/0023* (2013.01); *H04L 5/0032* (2013.01);
(Continued)

(58) Field of Classification Search
CPC ....... H04W 4/06; H04W 72/04; H04W 88/08; H04W 76/00; H04W 72/005; H04J 11/0079
See application file for complete search history.

(56) References Cited

U.S. PATENT DOCUMENTS

2004/0204105 A1* 10/2004 Liang et al. ............... 455/562.1
2008/0200211 A1*  8/2008 Hwang ................. H04W 16/26
                                                         455/562.1
(Continued)

FOREIGN PATENT DOCUMENTS

CN    101873609    10/2010
CN    101877865    11/2010
(Continued)

OTHER PUBLICATIONS

Chinese Office Action dated Jun. 30, 2015 issued in counterpart application No. 201180057581.7, 13 pages.
(Continued)

*Primary Examiner* — Lonnie Sweet
(74) *Attorney, Agent, or Firm* — The Farrell Law Firm, P.C.

(57) ABSTRACT

An apparatus and method for transmitting reference signals in a communication system are provided. The method includes transmitting common reference signals of a first type from a transmitter to a plurality of receivers; transmitting receiver-specific reference signals of a second type from a plurality of distributed ports to a subset of the plurality of receivers; wherein the common reference signals of the first type and the receiver-specific reference signals of the second type are allocated to different resources from one another, and wherein the communication system includes the transmitter and the plurality of receivers and the transmitter uses a plurality of central ports and the plurality of distributed ports to transmit to the plurality of receivers.

10 Claims, 8 Drawing Sheets

(51) Int. Cl.
  *H04J 11/00* (2006.01)
  *H04W 72/00* (2009.01)
  *H04L 5/00* (2006.01)
(52) U.S. Cl.
  CPC .......... *H04L 5/0048* (2013.01); *H04L 5/0091* (2013.01); *H04W 72/005* (2013.01); *H04L 5/008* (2013.01); *H04L 5/0069* (2013.01)

(56) References Cited

U.S. PATENT DOCUMENTS

| | | |
|---|---|---|
| 2008/0232494 A1 | 9/2008 | Pan et al. |
| 2010/0069122 A1 | 3/2010 | Ito |
| 2010/0118989 A1* | 5/2010 | Sayana ................ H04L 5/0035 375/260 |
| 2010/0232384 A1 | 9/2010 | Farajidana et al. |
| 2010/0246527 A1* | 9/2010 | Montojo et al. .............. 370/330 |
| 2010/0272032 A1* | 10/2010 | Sayana ................ H04B 7/024 370/329 |
| 2011/0070891 A1 | 3/2011 | Nishio et al. |
| 2011/0199986 A1* | 8/2011 | Fong et al. .................... 370/329 |
| 2011/0216842 A1* | 9/2011 | Zhang et al. ................. 375/260 |
| 2011/0244877 A1* | 10/2011 | Farajidana ............ H04L 5/0023 455/452.2 |
| 2011/0275396 A1 | 11/2011 | Nishio et al. |
| 2012/0026936 A1 | 2/2012 | Zhang et al. |
| 2012/0051451 A1 | 3/2012 | Kwon et al. |
| 2012/0106493 A1* | 5/2012 | Noh ...................... H04L 5/0048 370/329 |
| 2012/0106501 A1 | 5/2012 | Kishiyama et al. |
| 2013/0176964 A1 | 7/2013 | Pan et al. |

FOREIGN PATENT DOCUMENTS

| | | |
|---|---|---|
| JP | 2010-068496 | 3/2010 |
| JP | 2010-522499 | 7/2010 |
| JP | 2010-219817 | 9/2010 |
| KR | 1020090105789 | 10/2009 |
| WO | WO 2009/157167 | 12/2009 |
| WO | WO 2010/087176 | 8/2010 |
| WO | WO 2010/098581 | 9/2010 |
| WO | WO 2010/110576 | 9/2010 |
| WO | WO 2010/118558 | 10/2010 |
| WO | WO 2010/128836 | 11/2010 |

OTHER PUBLICATIONS

Qualcomm Inc., "SFBC PDSCH Transmission for LTE-A UEs", R1-106352, 3GPP TSG-RAN WG1 #63, Nov. 15-19, 2010, 4 pages.
Japanese Office Action dated Oct. 5, 2015 issued in counterpart application No. 2013-541931, 4 pages.
Ericsson, ST-Ericsson, "Further Details on CSI RS Configuration", R1-105322, 3GPP TSG-RAN WG1 #62bis, Oct. 11-15, 2010, 4 pages.
Japanese Office Action dated May 30, 2016 issued in counterpart application No. 2013-541931, 5 pages.
Research in Motion, UK Limited, "Downlink DM-RS Design Considerations for LTE-A", R1-093283, 3GPP TSG RAN WG1 Meeting #58, Aug. 24-28, 2009, 6 pages.
Alcatel-Lucent, "E-UTRA DL RS Aspects of Narrowband Interference Combating", R1-072045, 3GPP TSG RAN WG1 #49, May 7-11, 2007, 5 pages.
European Search Report dated Sep. 6, 2016 issued in counterpart application No. 11845440.4-1851, 7 pages.

\* cited by examiner

METHOD AND APPARATUS FOR REFERENCE SIGNALING ALLOCATION AND CHANNEL ESTIMATION IN DISTRIBUTED ANTENNA SYSTEMS

PRIORITY

This application claims priority under 35 U.S.C. §119(e) to a Provisional Patent Application filed in the United States Patent and Trademark Office on Dec. 3, 2010 and assigned Ser. No. 61/419,557, the entire disclosure of which is incorporated herein by reference.

BACKGROUND OF THE INVENTION

1. Field of the Invention

The present invention relates generally to a wireless communication system that transmits channel state information reference signals, and more particularly, to channel state information reference signals that are common to all User Equipments (UEs) in the cell that can recognize the reference signals. Without being limited thereto, the present invention may be applied to the 3rd Generation Partnership Project (3GPP) Releases 10, 11 and beyond

2. Description of the Related Art

CSI-RS in 3GPP Release 10

In 3GPP release 10, the system supports up to eight transmit antenna ports, while in previous Releases 8 and 9, systems could only support up to four transmit antenna ports. In doing so, new reference signaling was designed for the increased number of antenna ports. This reference signaling is cell-specific without precoding, and is called Channel State Information Reference Signal (CSI-RS).

FIG. 1 illustrates the CSI-RS pattern in a Resource Block (RB) when configured for Frequency Division Duplexing (FDD) system in 3GPP Release 10. The CSI-RS is so designed that it does not collide with the Common Reference Signaling (CRS) and Demodulation Reference Signaling (DMRS) in Release 8 and 9.

The CSI-RS pattern in Release 10 can support up to 20 antenna port pairs, or 40 antenna ports. Since a communication link in Release 10 supports up to 8 antenna ports, the other 16 port pairs can be configured for neighboring cells' CSI-RS transmission, and the Evolved Node B (eNB) can configure corresponding Resource Elements (REs) to be muted for better inter-cell interference mitigation. The configuration of CSI-RS transmission and CSI-RS RE muting is carried by higher layer Radio Resource Connection (RRC) signaling.

Distributed Antenna Systems

As the legacy systems such as 3GPP release 10 will be further improved, more antennas can be deployed in a distributed way throughout the cell to further increase the throughput of the cell.

SUMMARY OF THE INVENTION

Accordingly, the present invention has been made to solve the above-stated problems occurring in the prior art, and an aspect of the present invention provides an apparatus and method for reference signaling allocation and channel estimation to support distributed antennas systems In accordance with an aspect of the present invention, a method for transmitting reference signals in a communication system is provided. The method includes transmitting common reference signals of a first type from a transmitter to a plurality of receivers; transmitting receiver-specific reference signals of a second type from a plurality of distributed ports to a subset of the plurality of receivers; wherein the common reference signals of the first type and the receiver-specific reference signals of the second type are allocated different resources from one another, and wherein the communication system includes the transmitter and the plurality of receivers and the transmitter uses a plurality of central ports and the plurality of distributed ports to transmit to the plurality of receivers.

In accordance with another aspect of the present invention, a communication system is provided. The system includes a transmitter which uses a plurality of central ports and a plurality of distributed ports to transmit to a plurality of receivers, transmits common reference signals of a first type from the plurality of central ports to the plurality of receivers, transmits a receiver-specific reference signals of a second type from the plurality of distributed ports to a subset of the plurality of receivers; the plurality of receivers which receives configurations of the common reference signals of the first type and the receiver-specific reference signals of the second type; and wherein the common reference signals of the first type and the receiver-specific reference signals of the second type are allocated different resources from one another.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

In the detailed description, UEs based on Release 10 and earlier will be referred as legacy UEs, while UEs based on Release 11 and later will be referred as non-legacy UEs. The non-legacy UEs are assumed to support the evolved system with distributed antennas. However, these newly deployed antenna ports are not visible to the legacy UEs.

In the present invention, multiple distributed antenna ports are deployed in the cell coverage in addition to a plurality of central antenna ports.

The present invention provides an apparatus and methods for a communication system to transmit reference signals, where the communication system includes a transmitter and a plurality of receivers.

The transmitter uses a plurality of central ports and a plurality of distributed ports to transmit to the plurality of receivers. The transmitter transmits common reference signals of a first type from the plurality of central ports to all the plurality of receiver. Common reference signals of the first type is transmitted on every resource block contiguously in the frequency domain when scheduled and the transmitter broadcasts on which resource a common reference signals of a first type are transmitted in prior to the transmission of the common reference signals of the first type.

The transmitter transmits receiver-specific reference signals of a second type from the plurality of distributed ports to a subset of the plurality of receivers. For a specific receiver, the receiver-specific reference signals of the second type are transmitted on each of a predefined number of resource blocks in the frequency domain when scheduled. In another preferred embodiment, for a specific receiver, the receiver-specific reference signals of the second type are transmitted on a plurality of contiguous resource blocks within a sub-band of the frequency domain when scheduled.

The transmitter indicates to a receiver on which resource a receiver-specific reference signals second type of is transmitted to the receiver in prior to the transmission of the receiver-specific reference signals of the second type.

The communication system resources are partitioned into multiple two-dimensional resource blocks in both frequency and time dimensions. A resource block spans a predefined number of OFDM symbols, which is defined as a subframe in the time domain, e.g., 7 OFDM symbols in 3GPP release 8 to 10 systems. A resource block spans a predefined number of subcarriers in the frequency domain, e.g., 12 subcarriers in 3GPP release 8 to 10 systems.

The resources used for the common reference signals of the first type and the receiver-specific reference signals of the second type are not identical to one another. The common reference signals of the first type and receiver-specific reference signals of the second type are not necessarily transmitted in every subframe, and they are not necessarily transmitted in a same subframe.

System Infrastructure

Figure 1:
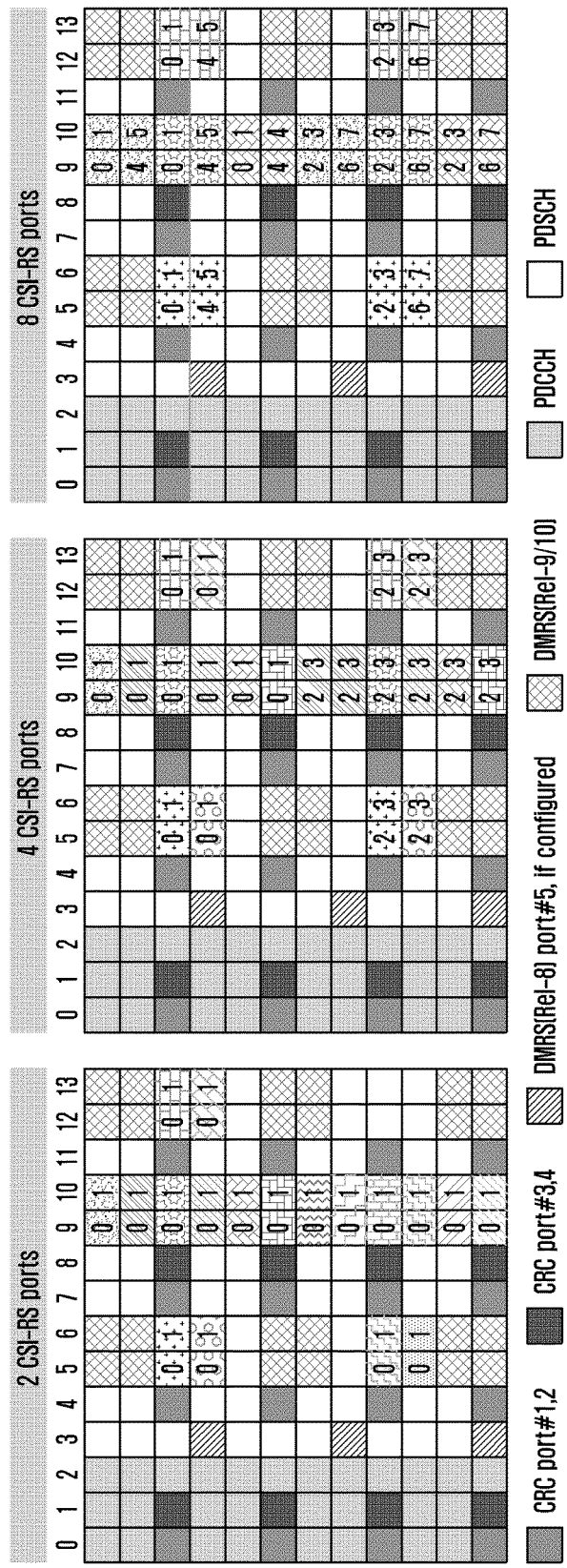
FIG. 1 illustrates a legacy CSI-RS pattern configuration for FDD system.
Figure 2:
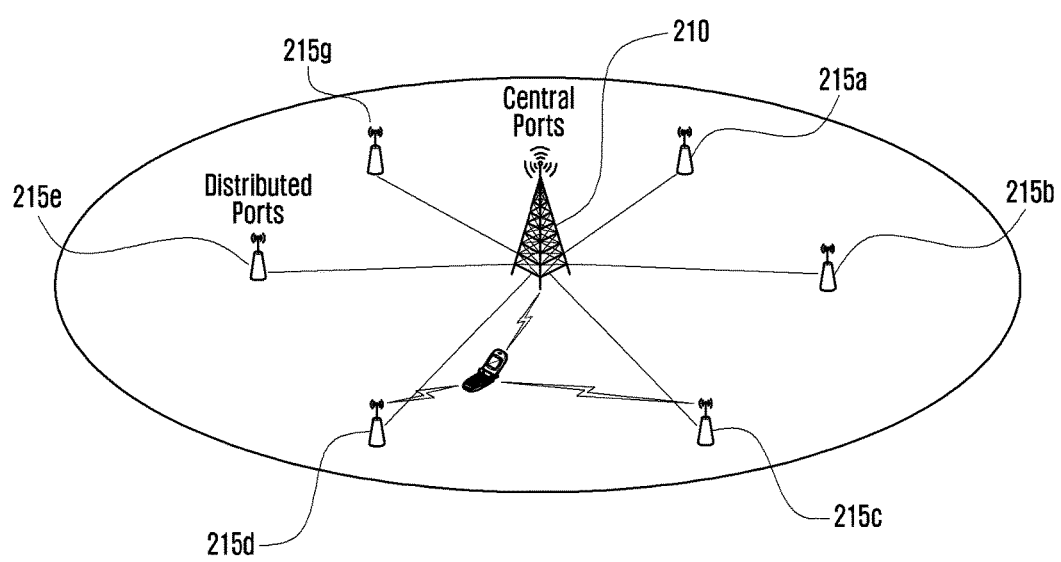
FIG. 2 illustrates a distributed antenna system deployment.

FIG. 2 illustrates a scenario of a Distributed Antenna System (DAS), where a central control unit 210 is attached with multiple antenna elements 215a, 215b, 215c, 215d, 215e, 215g. At least one antenna element 215a, 215b, 215c, 215d, 215e, 215g may be used to form one antenna port. Depending on the transmit power and coverage, there may are two categories of antenna ports in DAS.

The first one is referred as central ports 210, which defines the cell coverage, and all central ports 210 are visible to all UEs within the cell coverage. The central ports are also called conventional antenna ports in legacy cellular systems.

The second type of antenna ports are distributed ports 215a, 215b, 215c, 215d, 215e, 215g; they are attached to the central control unit with a direct link or other high-speed links. The transmit power or antenna direction is tuned for those distributed antennas 215a, 215b, 215c, 215d, 215e, 215g so that the coverage area of a distributed antenna port is usually a subset of the central antenna ports 210.

D-P CSI-RS Allocation: Sparse Allocation

As stated, the system in general transmits two types of CSI-RS: Central Ports (C-P) CSI-RS, and Distributed Ports (D-P) CSI-RS. The transmissions of these two types of CSI-RSs are independently scheduled based on the capabilities of UEs, and/or location of the UE, and/or the channel qualities for each antenna port.

Figure 3:
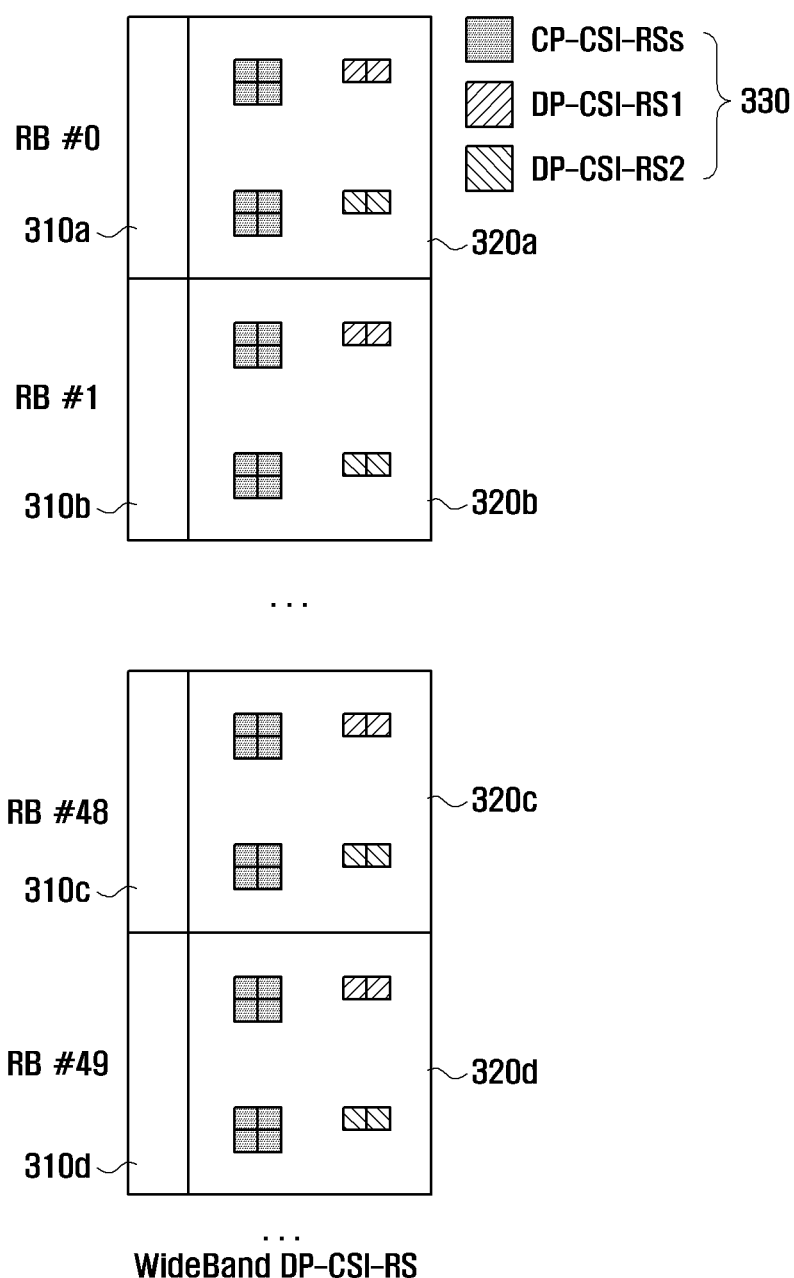
FIG. 3 illustrates a wide band D-P CSI-RS reusing the legacy CSI-RS properties.

If the non-legacy system is going to reuse exactly the same CSI-RS pattern in legacy systems for D-P CSI-RS, the D-P CSI-RS should be transmitted on every RB as depicted in FIG. 3 for a system bandwidth of 50 RBs. However, when the number of D-Ps is large, such a resource allocation becomes overhead-costing.

In FIG. 3, a Physical Downlink Control CHannel (PDCCH) is allocated at symbols located in an area of reference number 310a, 310b, 310c, and 310d and Physical Downlink Shared CHannel (PDSCH) is allocated at symbols located in an area of 320a, 320b, 320c, and 320d. The C-P CSI-RS, the D-P CSI-RS 330 is allocated at symbols located in the area of reference number 320a, 320b, 320c, and 320d.

Figure 4:
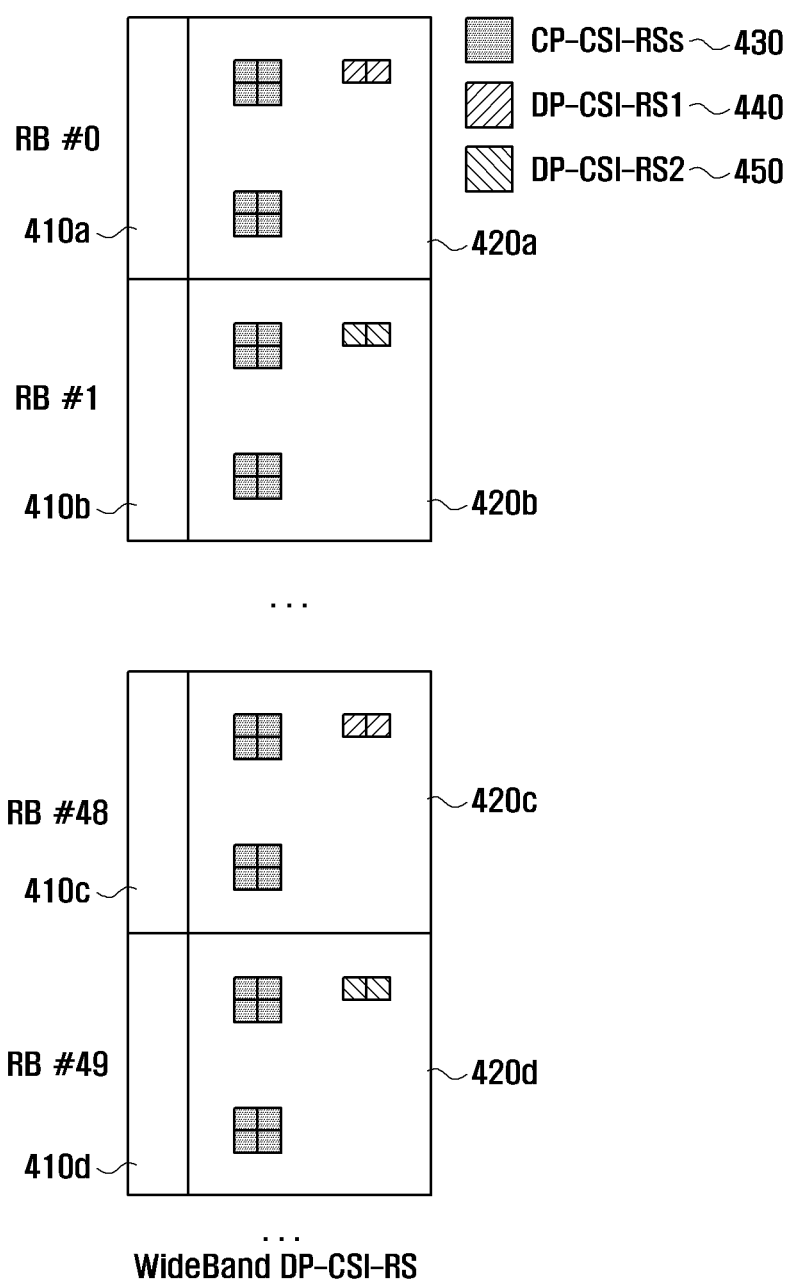
FIG. 4 illustrates a sparse D-P CSI-RS distribution.

In one embodiment, the D-P CSI-RS is transmitted in parallel to C-P CSI-RS. FIG. 4 illustrates an RE allocation for C-P CSI-RS and D-P CSI-RS with sparse configuration. It is noted that C-P CSI-RS and D-P CSI-RS should not necessarily be allocated in the same sub-frame, although FIG. 4 shows them as allocated in the same sub-frame. In FIG. 4, Physical Downlink Control CHannel (PDCCH) is allocated at symbols located in an area of reference number 410a, 410b, 410c, and 410d and PDSCH is allocated at symbols located in an area of reference number 420a, 420b, 420c, and 420d. The C-P CSI-RS 430, the D-P CSI-RS1 440 and D-P CSI-RS2 450 is allocated at symbols located in the area of reference number 420a, 420b, 420c, 420d.

In an embodiment, the D-P CSI-RS1 440 and D-P CSI-RS2 450 for a specific D-P1, D-P2 are sparsely transmitted on the frequency domain, i.e., the D-P CSI-RS1 440 and D-P CSI-RS2 450 for a specific D-P are not transmitted on every RB in the frequency domain but on every N RBs. FIG. 4 illustrates the case of N=2, where the CSI-RS1 440 for D-P1 is transmitted in the RBs with even indices, while the CSI-RS2 450 for D-P2 is transmitted in the RBs with odd indices.

Such a uniformly sparse distribution gives identical spacing among D-P CSI-RS across the whole bandwidth, and thus allows simple Fast Fourier Transform (FFT)-based channel estimation. The density or periodicity in the time domain of D-P CSI-RS can either be fixed (e.g., every two PRBs in the frequency domain), or configurable. In the latter case, when the eNB sends D-P CSI-RS configuration information to the UE, it contains both RE location and density information.

Thus, there are two types of CSI-RS coexisting in the system, C-P CSI-RS, which is cell-specific, and fixed-density, and D-P CSI-RS, which is UE-specific and the density can be configured.

D-P CSI-RS Allocation: Sub-Band Allocation

In another embodiment, the D-P CSI-RS can be configured on a sub-band of the system bandwidth instead of across the whole system bandwidth.

Figure 5:
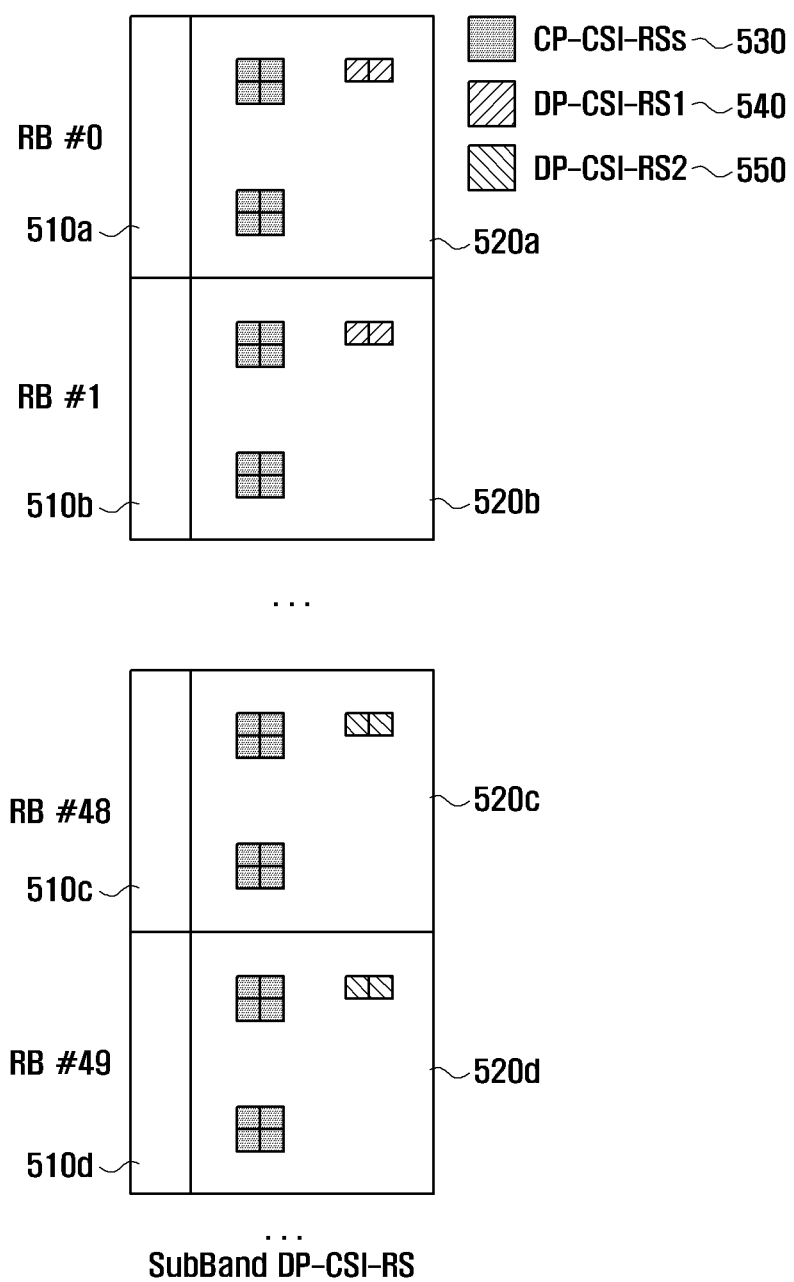
FIG. 5 illustrates a sub-band D-P CSI-RS distribution.

FIG. 5 illustrates an RE allocation for C-P CSI-RS and D-P CSI-RS with sub-band configuration. It is noted that C-P CSI-RS and D-P CSI-RS do not necessarily have to be allocated to the same subframe, as shown in FIG. 5.

In FIG. 5, Physical Downlink Control CHannel (PDCCH) is allocated at symbols located in area 510a, 510b, 510c, 510d and Physical Downlink Shared CHannel (PDSCH) is allocated at symbols located in area 520a, 520b, 520c, and

520$d$. The C-P CSI-RS 530, the D-P CSI-RS1 540 and D-P CSI-RS2 550 is allocated at symbols located in area 520$a$, 520$b$, 520$c$, and 520$d$.

In the embodiment, the D-P CSI-RSs 540 and 550 for a specific D-Ps are transmitted locally on a sub-band of the system bandwidth, i.e., the D-P CSI-RSs 540 and 550 are not transmitted on every RB in the frequency domain but a subset of RBs are included within a sub-band of the system bandwidth. FIG. 5 illustrates a case of two sub-bands, where the CSI-RS1 540 for D-P1 is transmitted in the first half bandwidth with RBs #0-#24, while the CSI-RS2 550 for D-P2 is transmitted in the second half of the bandwidth with RBs #25~#49. The D-P CSI-RSs 540 and 550 are not spreading onto the whole bandwidth and, thus, a channel estimator different from that of C-P CSI-RS 530 should be used. The estimator may also reuse the sub-band channel estimator for other purposes in the system. For example, the estimator may be used for demodulation reference signaling, which is also transmitted on a sub-band of the system.

The sub-band of D-P CSI-RSs 540 and 550 should be configurable for each UE. When the eNB sends D-P CSI-RS configuration information to the UE, it contains both RE location and sub-band information. In another embodiment, the sub-band is configured as in the same sub-band of the latest resource allocated for data transmission for the UE.

D-P CSI-RS Allocation: Sparse Allocation with Sub-Band Transmission

In another embodiment, the above two schemes can be combined to provide sparse D-P CSI-RS transmission on a sub-band.

Both density and sub-band should be indicated to the UE before the actual D-P CSI-RS transmission.

UE Behavior with D-P CSI-RS

Legacy UEs

When the D-P CSI-RS is present, the legacy release 10 UEs may not be available to recognize them. There are two alternatives to handle the D-P CSI-RS for legacy UEs:

Alt. 1: the eNB will configure those REs for D-P CSI-RS to be muted for legacy release 10 UE, so that the legacy UEs will assume those REs are muted for CSI-RS transmission from other cells. The eNB and UE will perform rate matching for those mute RE when doing resource scheduling.

Alt. 2: the eNB will not configure those REs for D-P CSI-RS to be muted for legacy release 10 UE the legacy UEs will have to assume that those REs are still carrying data symbols if allocated to them. The eNB will perform data puncturing for those mute RE when doing resource scheduling for the release 10 legacy UEs.

Alt. 1 may be preferable to Alt. 2 since CSI-RS RE muting is already supported in the legacy systems. In general, there is no change for release 10 legacy UEs' behavior when D-P CSI-RS is configured, so that the proposed DAS system is backward compatible.

Non-Legacy UEs

Figure 6:
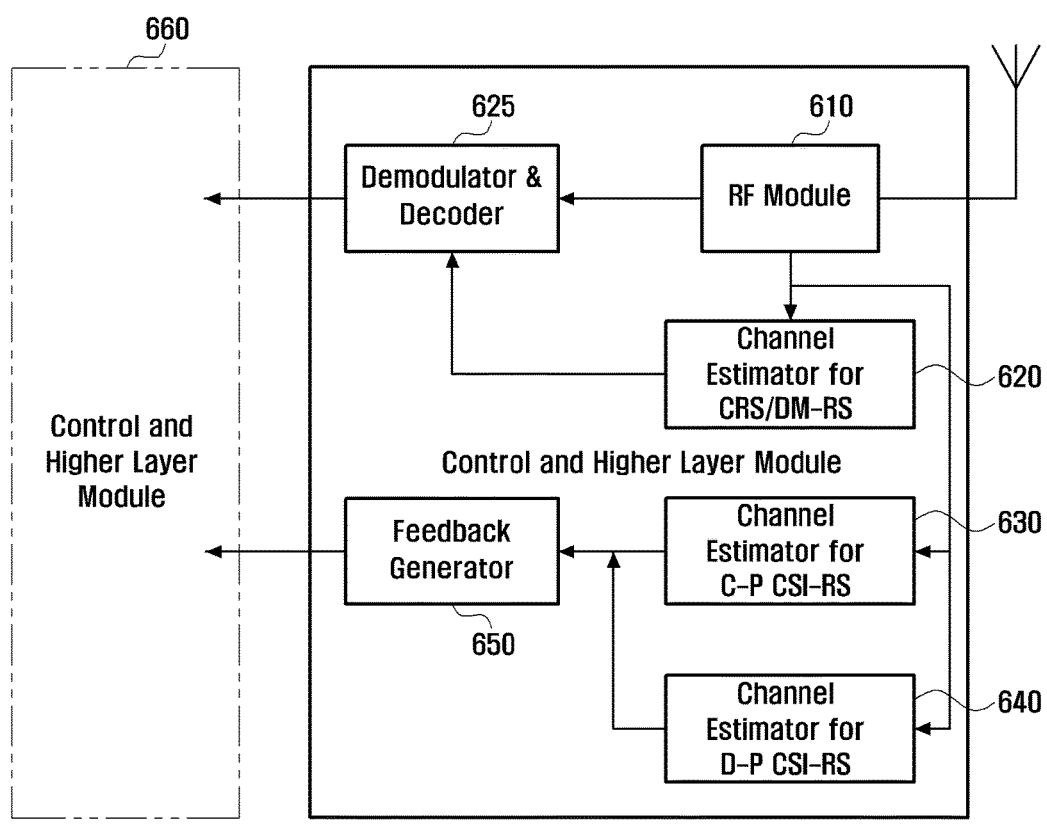
FIG. 6 illustrates a receiver structure for a non legacy UE for D-P CSI-RS processing.

FIG. 6 illustrates a receiver structure for a non-legacy UE for D-P CSI-RS processing. The received base-band signals after RF processing at a RF Module 610 will be used for channel estimations based on different reference signals in a Channel Estimator for CRS/DM-RS 620. The legacy system supports CRS, DMRS and wideband CSI-RS.

The estimated channel based on CRS and Demodulation Reference Signal. DNS (DMRS) will be used for demodulation of data/control payload in a Demodulator and Decoder 625, while the estimated channel of CSI-RS will be used to generate feedback to the eNB about the channel state information in Feedback Generator 650. Three channel estimators are necessary for channel estimation for each RS when present.

Unlike the legacy infrastructure, a new channel estimator for the proposed new categories of DP CSI-RS is necessary. The baseband signals are fed into the two CSI estimators for the new proposed D-P CSI-RS and legacy C-P CSI-RS. In the illustration in FIG. 6, it is assumed the two estimators are separated in parallel. However, it is noted that they can also reuse the same channel estimator with different configurations. The output of the D-P CSI-RS and C-P CSI-RS channel estimator will be used to generate channel state information feedback to the eNB. The output of payload decoder and channel state estimation will be sent to a controller 660 with higher layer capability for post-processing and actual feedback generation and scheduling.

When the D-P CSI-RS is present, the eNB will send D-P CSI-RS configuration to the related UE. Preferably, this message is transmitted via RRC configuration signaling. The RRC can be uni-cast for one UE or multi-cast for multiple UE who monitors the same set of D-Ps.

Figure 7:
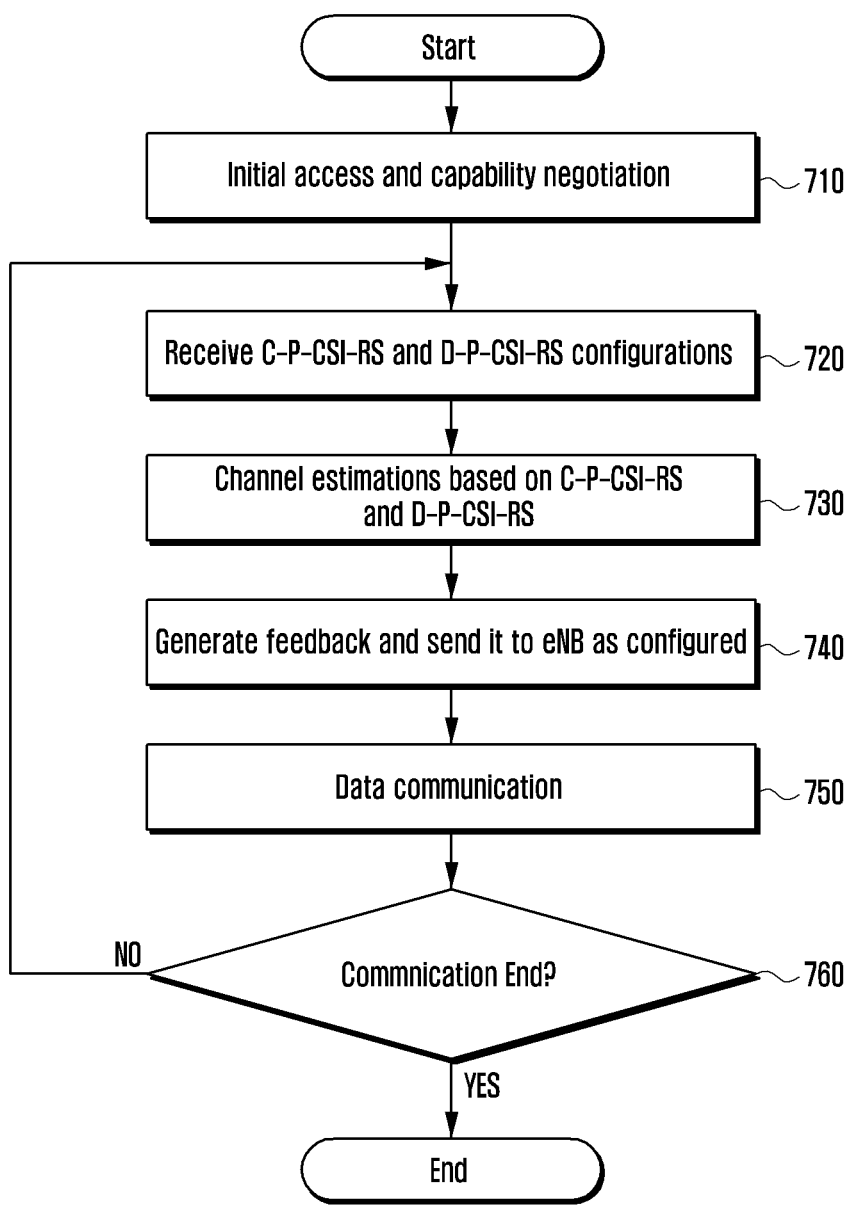
FIG. 7 illustrates a flowchart of UE behavior on D-P CSI-RS processing.

FIG. 7 illustrates the non-legacy UEs' behavior with respect to using the D-P CSI-RS.

The UE performs initial access and capability negotiation in step 710. The eNB first sends the D-P CSI-RS configuration to the UE, so that the UE receives C-P-CSI-RS and D-P-CSI-RS configurations in step 720. The UE acquires the resource that is used for D-P CSI-RS transmission; the UE will also acquire the C-P CSI-RS via the legacy cell-specific RRC configuration. If a CSI-RS pattern is both configured as muted in legacy cell-specific configuration and as D-P CSI-RS in non-legacy UE-specific configuration, the UE will assume the latter.

The UE will perform channel estimations on both D-P CSI-RS and C-P CSI-RS upon the reception in step 730. If the D-P CSI-RS and C-P CSI-RS are present in the same subframe, the order of channel estimations on both CSI-RS is an issue of implementation. The estimators used for the two types of CSI-RS channel estimation can either be differently designed or identically designed with different input parameter.

The UE will generate feedback based on the D-P CSI-RS and C-P CSI-RS received and sends the feedback to the eNB as configured in step 740. The feedback can be separate reports on D-P CSI-RS and C-P CSI-RS respectively, or a joint report on both. In the latter case, the UE may select several ports out of C-Ps and D-Ps for reporting, and the port selection information may also need to be indicated. The UE then performs data communication with the eNB to determine whether the data communication termination is selected. If the data communication termination is not selected, the UE will perform step 720 again.

eNB Behavior with D-P CSI-RS

Figure 8:
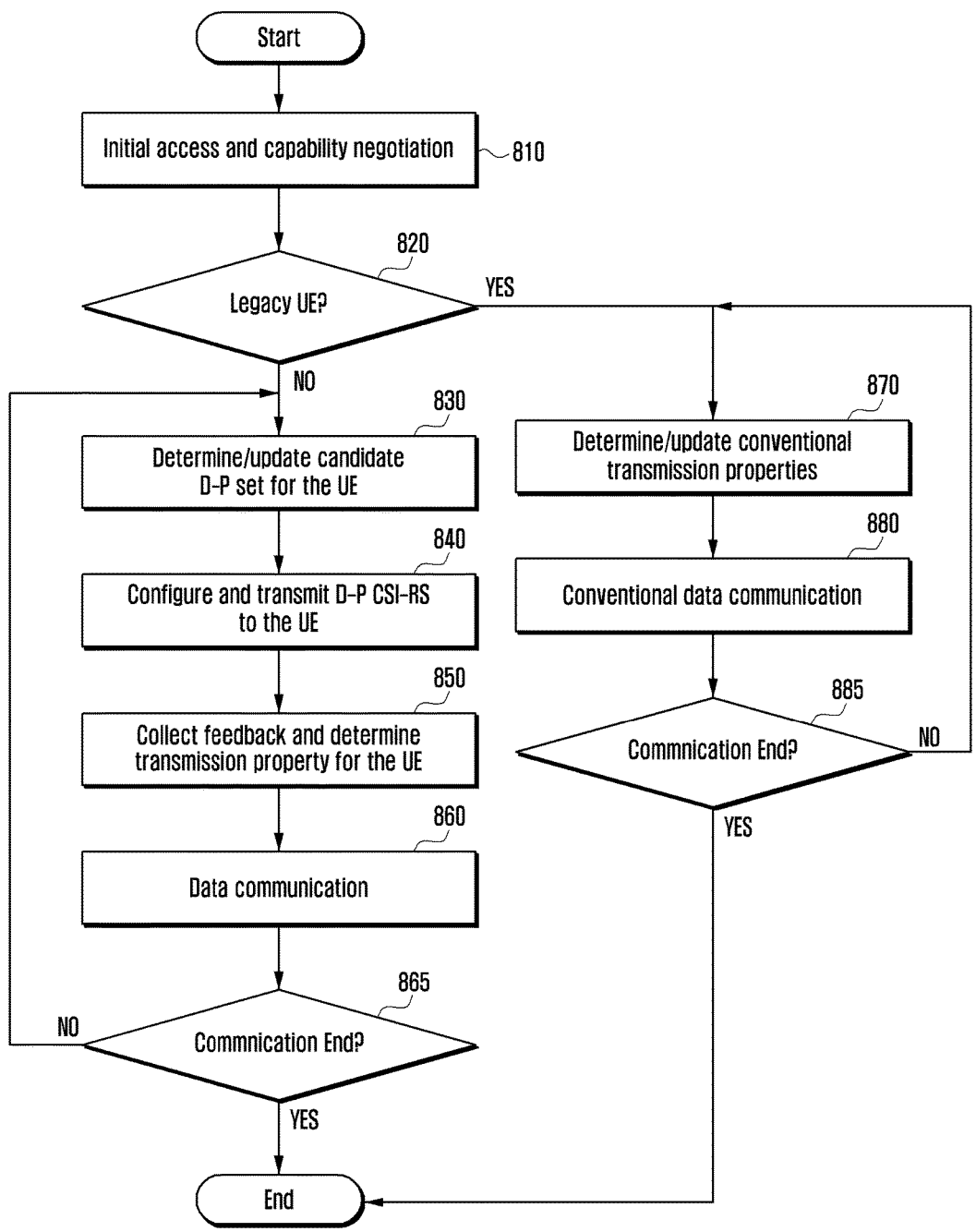
FIG. 8 illustrates a flowchart of eNB behavior on D-P CSI-RS processing.

FIG. 8 illustrates a flow chart for eNB and non-legacy UEs in using the distributed antennas.

The eNB performs initial access and capability negotiation in step 810 and determines whether the US is a legacy UE in step 820. The non-legacy UE accesses the network by using similar procedures to the legacy system. The UE and eNB exchange capability information so that the eNB recognizes that the accessing UE is capable of communication using the distributed antennas.

The eNB optionally configures uplink sounding reference signaling for the UE to determine a candidate set for it, and the eNB updates the candidate set information to the UE. The candidate set can also be determined by other means, e.g., based on the location of the UE in step 830.

The eNB configures D-P CSI-RS for the UE in step 840. The UE will report the measured channel on those configured distributed ports. The configuration of D-P CSI for a non-legacy UE can be one of the following:

Alt. 1: The eNB configures a candidate D-P set for the UE, the eNB inform the UE of the D-P CSI-RS pattern configuration. The UE only reports the channel from the candidate D-P set.

Alt. 2: The eNB does not configures a candidate D-P set for the UE, instead the eNB inform the UE of the D-P CSI-RS pattern configuration. The UE reports the channel from the D-P CSI-RS together with the pattern index.

Upon receipt of the feedback on D-P CSI-RS from the UE, the eNB will decide on the transmission mode and/or transmission property for the UE in step 850. The eNB then communicates with the UE in step 860 and determines whether the data communication termination is selected in step 865. If the data communication termination is not selected, the eNB will perform step 830 again.

The adjustment will be transmitted to the UE via higher layer RRC signaling or via physical control channel signaling. The eNB may also adjust the D-P CSI-RS configuration and/or the candidate set for the UE when is necessary.

The cycle of D-P CSI-RS transmission and report continue until the communication between eNB and the UE is done, or the UE is configured to another transmission mode without utilizing the distributed antenna ports.

In step 820, if the UE is not a legacy UE, the eNB configures uplink reference signaling for the UE to determine conventional transmission properties, and updates conventional transmission properties to the UE in step 870. The eNB then performs conventional data communication with the UE in step 880 and determines whether the data communication termination is selected in step 885. If the data communication termination is not selected, the eNB will perform step 870 again.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transmitting channel state information (CSI) reference signals by an apparatus in a communication system, the method comprising:
    generating common reference signals for transmitting to a plurality of receivers and receiver-specific reference signals for transmitting to a subset of the plurality of receivers;
    transmitting first information indicating resource elements on which the common reference signals are transmitted;
    transmitting second information indicating resource elements on which the receiver-specific reference signals are transmitted;
    transmitting, from a plurality of central ports, the common reference signals based on the first information to the plurality of receivers; and
    transmitting, from a plurality of distributed ports, the receiver-specific reference signals based on the second information to the subset of the plurality of receivers,
    wherein the common reference signals and the receiver-specific reference signals are allocated different resources from one another, and
    wherein an interval between subcarriers that transmit the common reference signals is shorter than an interval between subcarriers that transmit the receiver-specific reference signals.

2. The method of claim 1, wherein the common reference signals are transmitted on every resource block scheduled contiguously in a frequency domain.

3. The method of claim 1, wherein the different resources are partitioned into multiple two-dimensional resource blocks in both frequency and time dimensions.

4. The method of claim 1, wherein the receiver-specific reference signals are transmitted on a plurality of contiguous resource blocks within a sub-band of a system bandwidth in a frequency domain.

5. The method of claim 1, wherein the receiver-specific reference signals are transmitted intermittently on resource blocks scheduled within a sub-band of a system bandwidth in a frequency domain.

6. An apparatus in a communication system, the apparatus comprising:
    a transmitter; and
    a processor configured to:
        generate common reference signals for transmitting to a plurality of receivers and receiver-specific reference signals for transmitting to a subset of the plurality of receivers;
        control the transmitter to transmit first information indicating resource elements on which the common reference signals are transmitted;
        control the transmitter to transmit second information indicating resource elements on which the receiver-specific reference signals are transmitted;
        control the transmitter to transmit, from a plurality of central ports, the common reference signals based on the first information to the plurality of receivers; and
        control the transmitter to transmit, from a plurality of distributed ports, the receiver-specific reference signals based on the second information to the subset of the plurality of receivers,
    wherein the common reference signals and the receiver-specific reference signals are allocated different resources from one another, and
    wherein an interval between subcarriers that transmit the common reference signals is shorter than an interval between subcarriers that transmit the receiver-specific reference signals.

7. The apparatus of claim 6, wherein the common reference signals are transmitted on every resource block scheduled in a frequency domain.

8. The apparatus of claim 6, wherein the different resources are partitioned into multiple two-dimensional resource blocks in both frequency and time dimensions.

9. The apparatus of claim 6, wherein the receiver-specific reference signals are transmitted on a plurality of contiguous resource blocks within a sub-band of a system bandwidth in a frequency domain.

10. The apparatus of claim 6, wherein the receiver-specific reference signals are transmitted intermittently on resource blocks within a sub-band of a system bandwidth in a frequency domain.

* * * * *